(12) United States Patent
Oe (10) Patent No.: US 11,830,984 B2
(45) Date of Patent: Nov. 28, 2023

(54) LITHIUM BATTERY, LITHIUM BATTERY MODULE, AND ELECTRONIC DEVICE

(71) Applicant: CASIO COMPUTER CO., LTD., Tokyo (JP)

(72) Inventor: Ryo Oe, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 356 days.

(21) Appl. No.: 17/093,949

(22) Filed: Nov. 10, 2020

(65) Prior Publication Data

US 2021/0194063 A1    Jun. 24, 2021

(30) Foreign Application Priority Data

Dec. 18, 2019 (JP) .................................. 2019-227793
Jul. 17, 2020 (JP) .................................. 2020-122475

(51) Int. Cl.
*H01M 10/0587* (2010.01)
*H01M 10/0525* (2010.01)
(Continued)

(52) U.S. Cl.
CPC ... *H01M 10/0587* (2013.01); *H01M 10/0468* (2013.01); *H01M 10/0525* (2013.01);
(Continued)

(58) Field of Classification Search
CPC ......... H01M 2220/30; H01M 10/0587; H01M 10/0468; H01M 10/0525; H01M 50/10;
(Continued)

(56) References Cited

U.S. PATENT DOCUMENTS 8,828,601 B2    9/2014    Hara et al.
9,716,254 B2    7/2017    Hara et al.
(Continued)

FOREIGN PATENT DOCUMENTS

CN    102074730 A    5/2011
CN    102439758 A    5/2012
(Continued)

OTHER PUBLICATIONS

Japanese Office Action dated Apr. 26, 2022, issued in counterpart Japanese Application No. 2020-122475.
(Continued)

*Primary Examiner* — Matthew W Van Oudenaren
(74) *Attorney, Agent, or Firm* — Holtz, Holtz & Volek PC (57) ABSTRACT

A lithium battery module includes: a wound body formed by winding a positive electrode and a negative electrode with a separator interposed between the positive electrode and the negative electrode; an exterior body enclosing the wound body; a protective case housing the exterior body; and a pressing member provided between the exterior body and the protective case, in which the exterior body includes: a first member serving as a base; and a second member provided in a partial region of the exterior body, the second member has lower stretchability than the first member, and the pressing member transfers pressing force from the protective case to the wound body through the second member to fix the wound body by pressing force from the exterior body.

13 Claims, 13 Drawing Sheets

(51) Int. Cl.
  *H01M 10/04* (2006.01)
  *H01M 50/10* (2021.01)
  *H01M 50/102* (2021.01)
  *H01M 50/474* (2021.01)

(52) U.S. Cl.
  CPC .......... *H01M 50/10* (2021.01); *H01M 50/102* (2021.01); *H01M 50/474* (2021.01); *H01M 2220/30* (2013.01)

(58) Field of Classification Search
  CPC .. H01M 50/14; H01M 50/471; H01M 50/102; H01M 50/103; H01M 50/105; H01M 50/107; H01M 50/109; H01M 50/11; H01M 50/141; H01M 50/143; H01M 50/145; H01M 50/133; H01M 50/134; H01M 50/136; H01M 50/20; H01M 50/202; H01M 50/204; H01M 50/207; H01M 50/209; H01M 50/211; H01M 50/213; H01M 50/216; H01M 50/218; H01M 50/22; H01M 50/222; H01M 50/224; H01M 50/227; H01M 50/229; H01M 50/231; H01M 50/233; H01M 50/236; H01M 50/238; H01M 50/24; H01M 50/242; H01M 50/244; H01M 50/247; H01M 50/249; H01M 50/251; H01M 50/253; H01M 50/262; H01M 50/264; H01M 50/267; H01M 50/269; H01M 50/271; H01M 50/273; H01M 50/276; H01M 50/278; H01M 50/28; H01M 50/282; H01M 50/284; H01M 50/287; H01M 50/289; H01M 50/291; H01M 50/293; H01M 50/296; H01M 50/298; B60L 50/64
  See application file for complete search history.

(56) References Cited

U.S. PATENT DOCUMENTS

| 10,217,972 | B2 | 2/2019 | Hara et al. |
| 11,101,512 | B2 | 8/2021 | Hara et al. |
| 2012/0308874 | A1 | 12/2012 | Ootani et al. |
| 2017/0294632 | A1* | 10/2017 | Liao .................... H01M 50/244 |

FOREIGN PATENT DOCUMENTS

| CN | 102810651 | A | | 12/2012 |
| CN | 208904103 | | * | 5/2019 |
| CN | 208904103 | U | * | 5/2019 |
| JP | 2003151616 | | * | 5/2003 |
| JP | 2003151616 | A | | 5/2003 |
| JP | 2005005008 | A | | 1/2005 |
| JP | 2008153203 | A | | 7/2008 |
| JP | 2015185256 | A | | 10/2015 |
| JP | 2017022057 | | * | 1/2017 |
| JP | 2017022057 | A | | 1/2017 |

OTHER PUBLICATIONS

Chinese Office Action (and English language translation thereof) dated Sep. 1, 2022, issued in counterpart Chinese Application No. 202011289769.1.

* cited by examiner

LITHIUM BATTERY, LITHIUM BATTERY MODULE, AND ELECTRONIC DEVICE

BACKGROUND

1. Technical Field

The present invention relates to a lithium battery, a lithium battery module, and an electronic device.

2. Related Art

With the reduction in size and weight of portable electronic devices, lithium batteries, which are secondary batteries with high energy density, have been used. In such a lithium battery, a wound body formed by winding a laminate of a positive electrode material, a separator, and a negative electrode material is accommodated together with an electrolyte in an exterior body formed of laminate or aluminum. In the lithium battery, the exterior body has a characteristic of expanding due to gas generated by repeated charging/discharging. A technique for coping with the expansion of the exterior body is disclosed in JP 2005-5008 A.

The mobile terminal disclosed in JP 2005-5008 A includes a means for bring a case lid into contact with a battery pack or biasing the case lid to the battery pack, and has a space for coping with the deformation of the battery pack due to expansion of the inside of the battery pack in at least one of the case lid or a battery housing portion.

In the technique disclosed in JP 2005-5008 A, the exterior body of the battery pack and the case lid or the battery housing portion of the electronic device are not fixed. Thus, when the battery pack expands, the constituent members inside the wound body can slide, which can cause a short circuit between the positive electrode and the negative electrode.

SUMMARY

In order to solve the above problem, a lithium battery module includes: a wound body formed by winding a positive electrode and a negative electrode with a separator interposed between the positive electrode and the negative electrode; an exterior body enclosing the wound body; a protective case housing the exterior body; and a pressing member provided between the exterior body and the protective case, in which the exterior body includes: a first member serving as a base; and a second member provided in a partial region of the exterior body, the second member has lower stretchability than the first member, and the pressing member transfers pressing force from the protective case to the wound body through the second member to fix the wound body by pressing force from the exterior body.

DETAILED DESCRIPTION

Hereinafter, an embodiment of the present invention (referred to as "the present embodiment" in the following) will be described in detail with reference to the drawings. Note that, the drawings are only schematic diagrams for the present embodiment to be sufficiently understood. In the drawings, common or similar constituent elements are denoted by the same reference signs, and duplicate description thereof is omitted. In addition, a lithium battery module housing a lithium battery is simply referred to as a "lithium battery". The lithium battery includes a lithium ion battery and a lithium polymer battery.

First Embodiment (Electronic Device)

Figure 1:
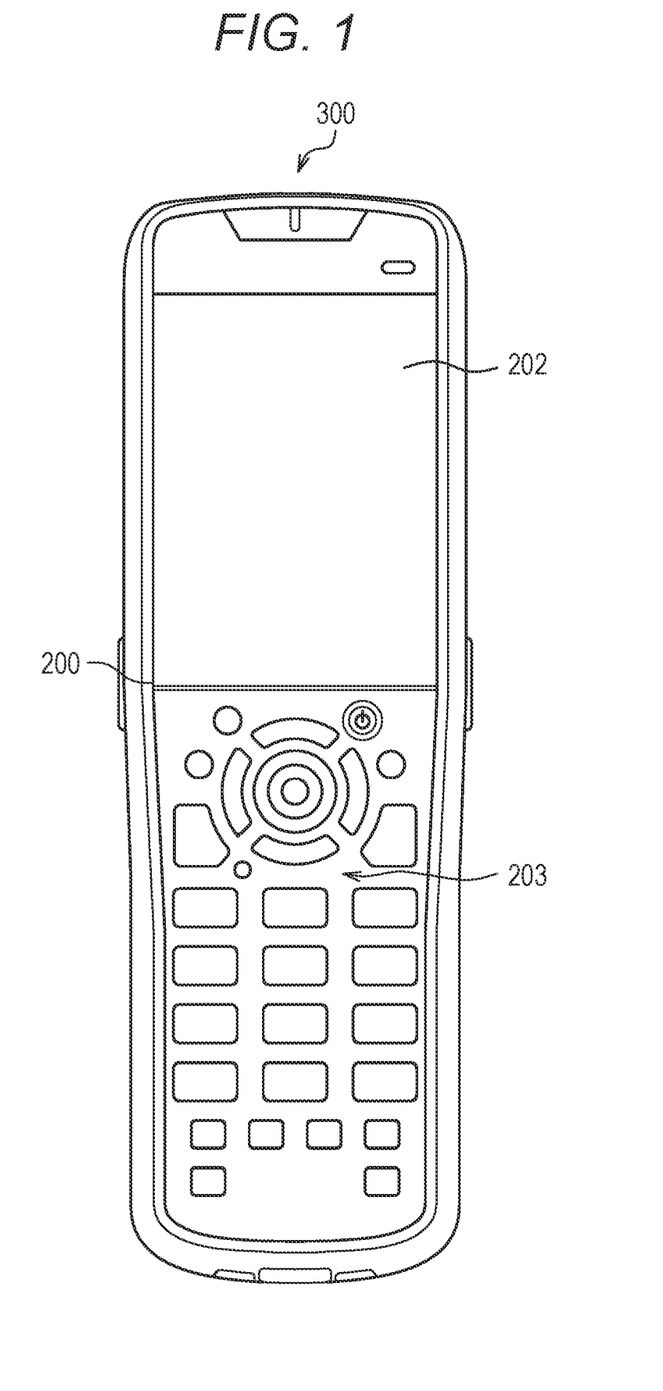
FIG. 1 is a plan view of an electronic device according to a first embodiment of the present invention.
Figure 2A:
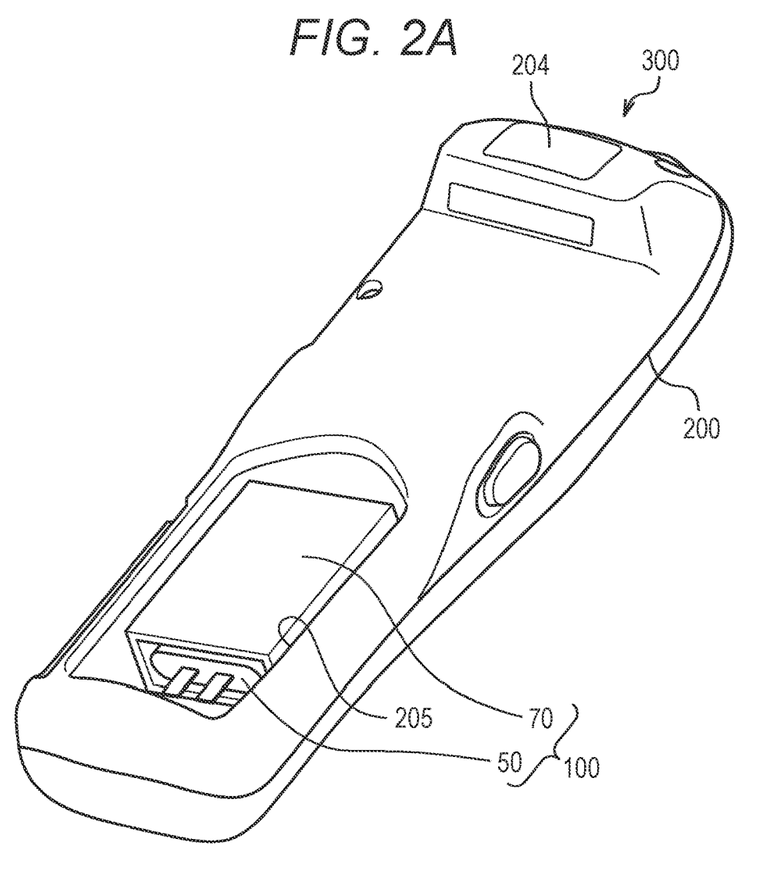
FIG. 2A is a perspective view of the back side of the electronic device according to the first embodiment of the present invention.

FIG. 1 is a plan view of the front side of an electronic device that accommodates a lithium battery according to a first embodiment of the present invention. FIG. 2A is a perspective view of the back side of the electronic device, and FIG. 2B is a perspective view of a battery lid.

Figure 2B:
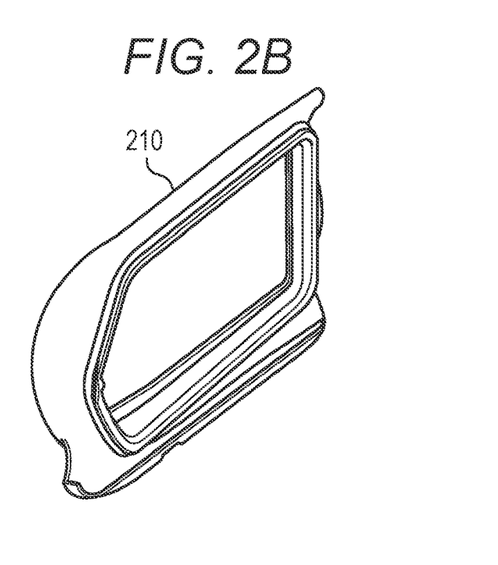
FIG. 2B is a perspective view of a battery lid of the electronic device according to the first embodiment of the present invention.

An electronic device 300 is a handheld terminal including a casing 200 (FIG. 2A) and a battery lid 210 (FIG. 2B). The casing 200 is provided with a display unit 202, a keyboard unit 203, and the like and formed with a battery housing portion 205. As shown in FIG. 2A, the battery housing portion 205 houses a lithium battery 100. The battery lid 210 (FIG. 2B) is attached while the lithium battery 100 is housed. The electronic device is not limited to the handheld terminal and may be a mobile terminal, such as a smartphone or a tablet.

Figure 3:
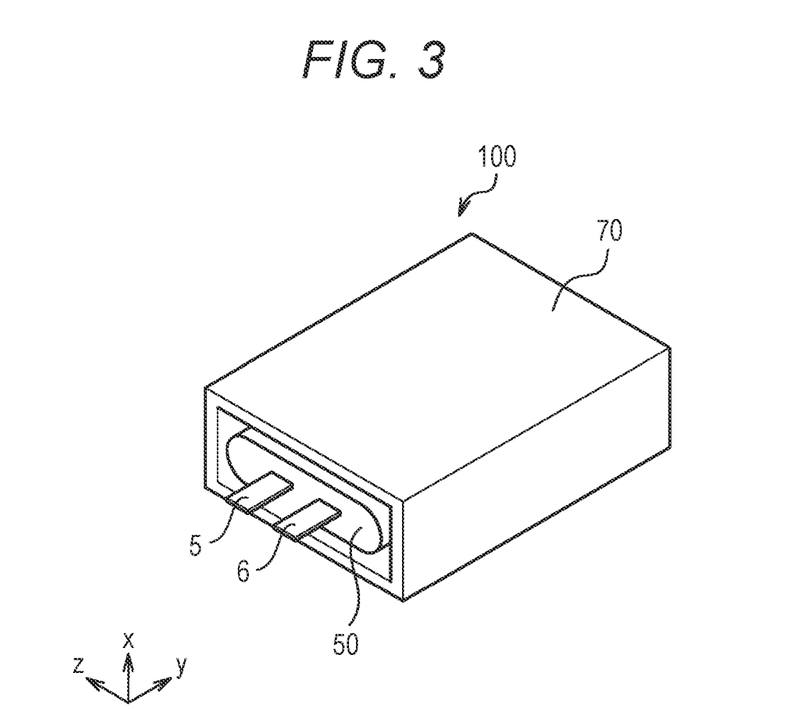
FIG. 3 is an external view of a lithium battery module housing a lithium battery according to the first embodiment of the present invention.

FIG. 3 is an external view of the lithium battery according to the first embodiment of the present invention.

The lithium battery 100 includes a rectangular parallelepiped protective case 70 and a cell 50 accommodated inside the protective case 70. The Y-Z plane of the protective case 70 is a large-area face, and the X-Y plane is a side face. The cell 50 is a chargeable/dischargeable secondary battery and has a flat shape. In addition, the cell 50 is provided with a positive electrode 5 and a negative electrode 6.

Figure 4A:
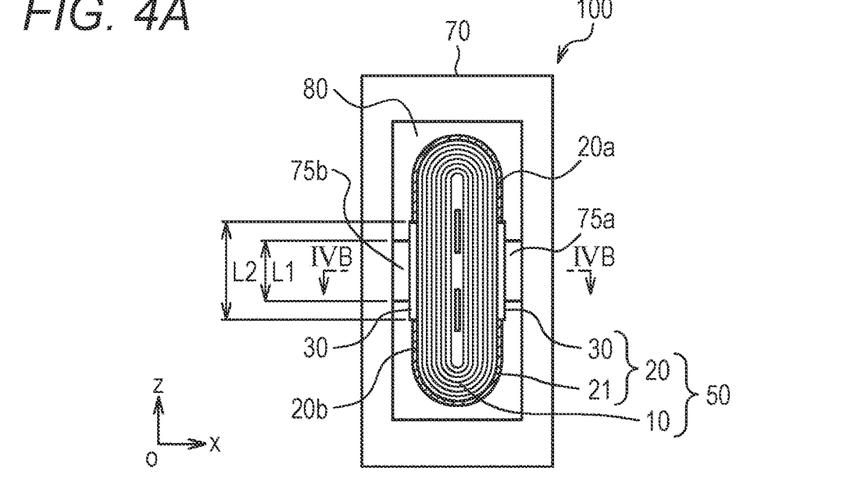
FIG. 4A is a left side view of the lithium battery module according to the first embodiment of the present invention.
Figure 4B:
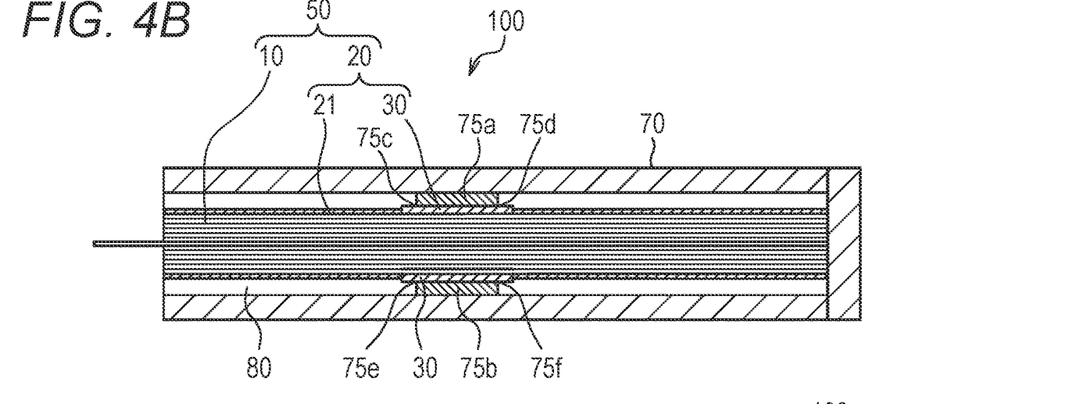
FIG. 4B is a sectional view of the lithium battery module according to the first embodiment of the present invention.
Figure 4C:
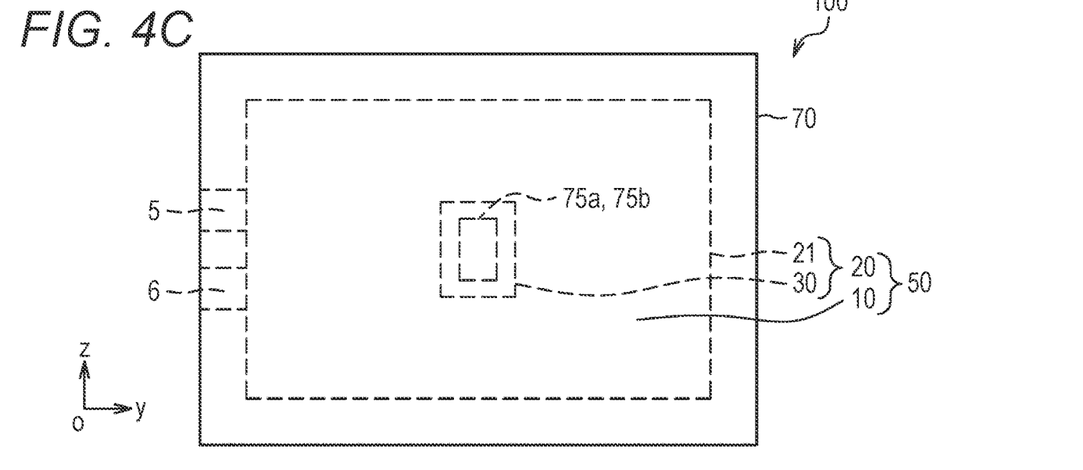
FIG. 4C is a plan view of the lithium battery module according to the first embodiment of the present invention.

FIGS. 4A, 4B, and 4C are structural diagrams of the lithium battery according to the first embodiment of the present invention. FIG. 4A is a left side face (X-Z plane), FIG. 4B is an IVB cross section thereof, and FIG. 4C is a plan view of a Y-Z plane.

The lithium battery 100 includes, in addition to the cell 50 and the protective case 70, two projecting portions 75a and 75b as fixing means or pressing members. The cell 50 includes an exterior body 20 and a wound body 10 (FIG. 6) accommodated in the exterior body 20. The exterior body 20 includes a main body portion 21 serving as a base and a non-stretchable member 30 provided in a partial region of the main body portion 21. Here, in the claims, the main body portion 21 is referred to as a first member, and the non-stretchable member 30 is referred to as a second member. That is, the first member is the base portion of the exterior body 20, and the second member is provided in a partial region of the exterior body 20.

The non-stretchable member 30 is a circular or rectangular plate material and is, for example, a non-conductive material, such as plastic, glass, ceramic (pottery), or the like. The stretchability of the non-stretchable member 30 is lower than that of the material (for example, laminate or aluminum) of the main body portion 21 of the exterior body 20.

A region that is a flat surface 20a or 20b and is provided with the non-stretchable member 30 is referred to as a non-stretchable region. The non-stretchable region is on each of a pair of flat surfaces 20a and 20b. The non-stretchable region provided on one flat surface 20a (a first non-stretchable region) is provided at a position corresponding to (overlapping) the non-stretchable region provided on the other flat surface 20b (a second non-stretchable region). At this time, the projecting portion 75a is a first fixing means, and the projecting portion 75b is a second fixing means. In other words, the non-stretchable members 30 and 30 provided in partial regions of the exterior body 20 are inserted between the projecting portion 75a and the wound body 10, and between the projecting portion 75b and the wound body 10. In addition, each of the projecting portions 75a and 75b as the pressing members is sandwiched between the non-stretchable member 30 and the protective case 70.

The protective case 70 is a rectangular parallelepiped case made of resin or metal and accommodates the cell 50 therein. One side (for example, the left side) of the protective case 70 is open, and the cell 50 can be inserted thereinto.

Figure 8A:
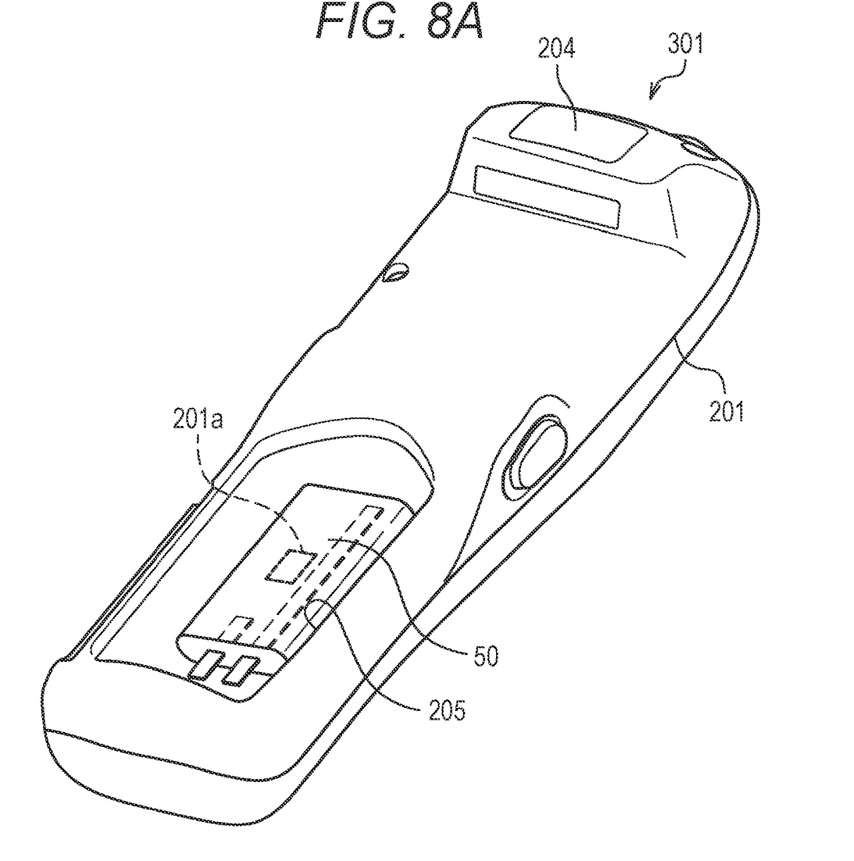
FIG. 8A is a perspective view of the back side of an electronic device according to a second embodiment of the present invention.
Figure 8B:
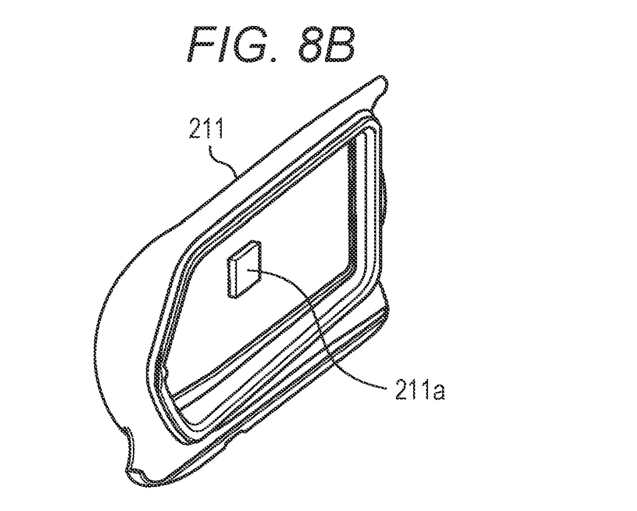
FIG. 8B is a perspective view of a battery lid of the electronic device according to the second embodiment of the present invention.
Figure 12:
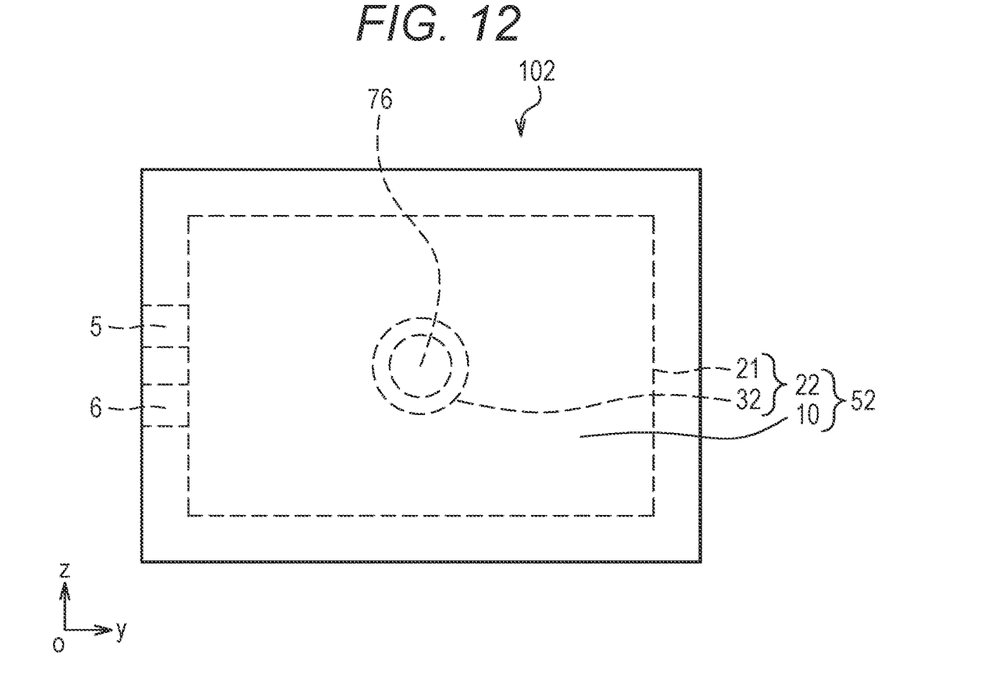
FIG. 12 is a plan view of a lithium battery module according to a second modification of the present invention.

Note that, a configuration in which the cell 50 is fitted from the outside of a casing 201 as shown in FIG. 8A, a projecting portion 211a as a pressing member is provided on the inner side of the lid as shown in FIG. 8B, and a battery lid 211 is used as a part of the protective case 70 to fix the cell 50 may be employed. The two projecting portions 75a and 75b extend on the protective case 70 in such a manner as to face each other. As shown in FIG. 4C, the projecting portions 75a and 75b as the pressing members each have a rectangular parallelepiped shape and a smaller size (area) than that of the non-stretchable member 30. The two projecting portions each may be a columnar projecting portion 76 as shown in FIG. 12.

The projecting portions 75a and 75b each are formed to have a predetermined thickness (height). The thickness is enough for the cell 50 (FIG. 2) having the non-stretchable members 30 and 30 formed on both sides to be inserted. The non-stretchable member 30 has an enough thickness to prevent the projecting portions 75a and 75b as the pressing members from being in contact with the main body portion 21 of the exterior body 20. In the protective case 70 in which the cell 50 is inserted, an internal space 80 is formed on both sides of the projecting portions 75a and 75b.

Figure 11:
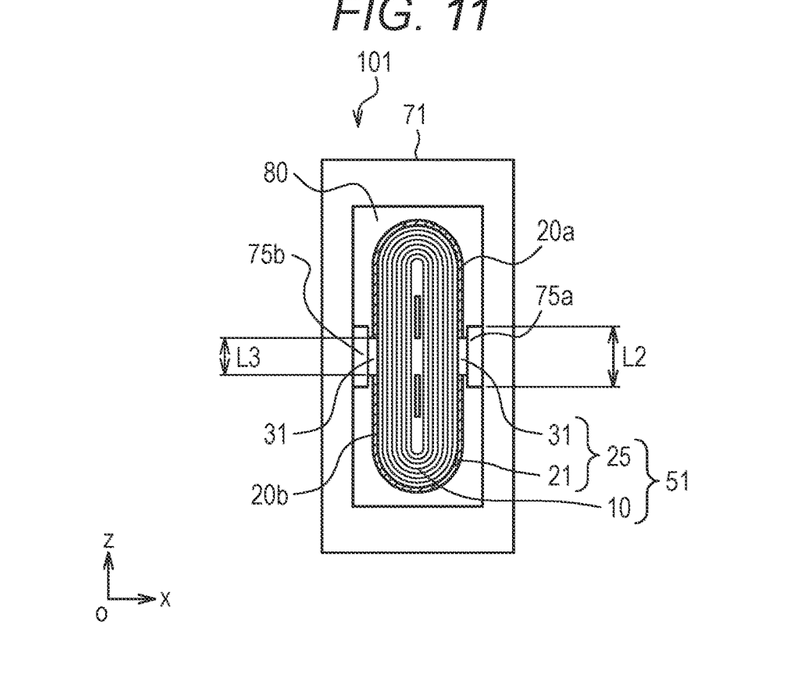
FIG. 11 is a left side view of a lithium battery module according to a first modification of the present invention.

Note that, the non-stretchable member may have a smaller area than that of the projecting portions 75a and 75b as the pressing members, like a non-stretchable member 31 in FIG. 11. In that case, the non-stretchable member 31 has an enough thickness to prevent the projecting portions 75a and 75b as the pressing members from being in contact with the main body portion 21 of the exterior body 20.

Note that, a configuration in which the projecting portions 75a and 75b are not integrated with the protective case 70, and the non-stretchable members 30 and 30 and corner portions 75c, 75d, 75e, and 75f of the projecting portions 75a and 75b are bonded with, for example, an adhesive may be employed. In that case, the cell 50 and the projecting portions 75a and 75b are integrated, and the projecting portions 75a and 75b and the protective case 70 are supplementarily supported when the lithium battery is inserted into the protective case 70.

Figure 5:
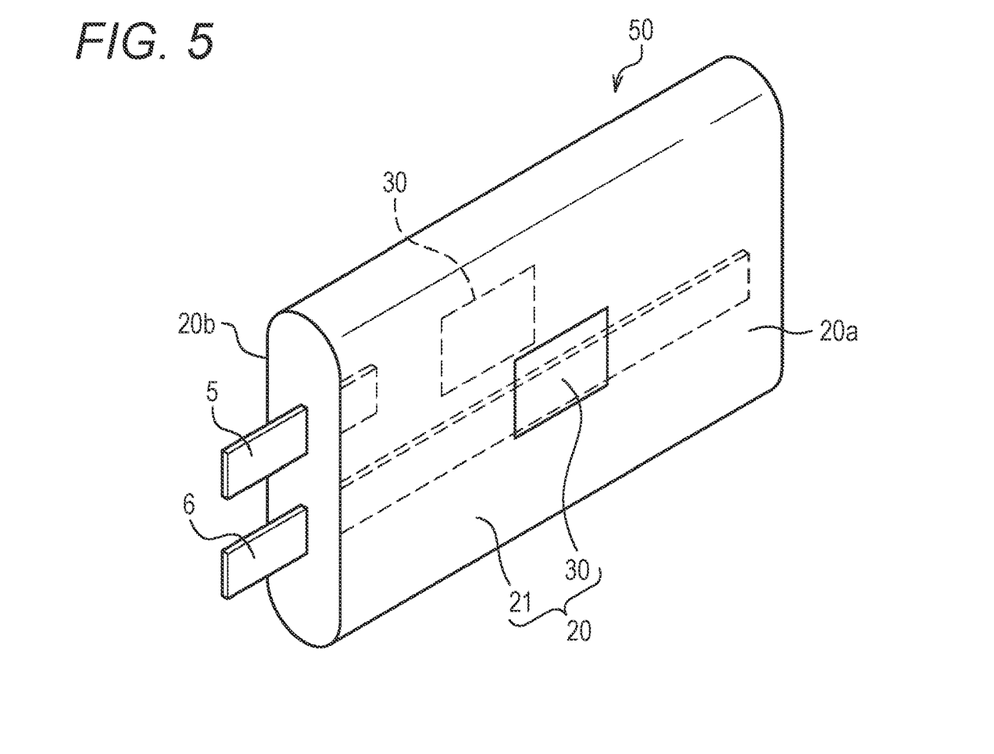
FIG. 5 is a perspective view of a cell of the lithium battery according to the first embodiment of the present invention.
Figure 6:
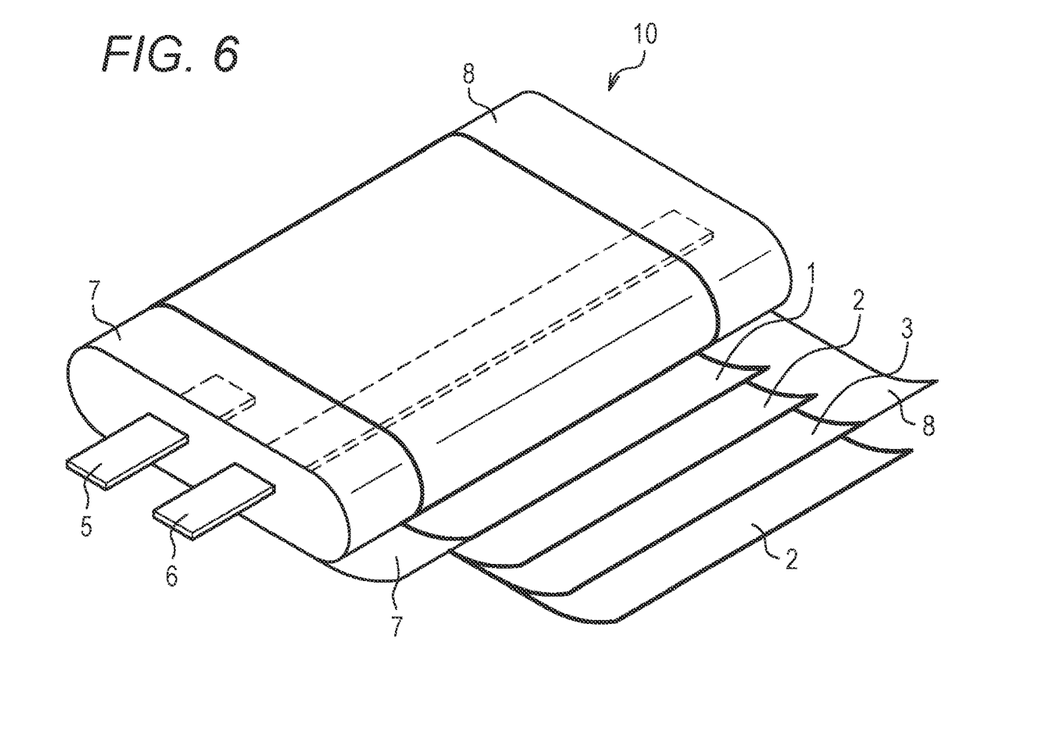
FIG. 6 is a structural diagram of a wound body of the lithium battery according to the first embodiment of the present invention.

FIG. 5 is a perspective view of the cell 50, and FIG. 6 is a perspective view of the wound body 10.

The cell 50 is formed by enclosing the wound body 10 (FIG. 6) inside the flat-shaped exterior body 20 together with an electrolytic solution, such as an organic solvent, a polymer, or the like. The exterior body 20 is sealed while accommodating the wound body 10. The exterior body 20 is provided with the non-stretchable members 30 and 30 formed at the center portions of the pair of flat surfaces 20a and 20b. In other words, the non-stretchable members 30 and 30 are formed in the central regions of both surfaces (flat surfaces 20a and 20b) of the exterior body 20. The main body portion 21 of the exterior body 20 excluding the non-stretchable members 30 and 30 is formed of laminate or aluminum. Laminate or aluminum has higher stretchability than the plastics, glass, or ceramics that forms the non-stretchable members 30 and 30.

The wound body 10 (FIG. 6) is formed by a laminate of a positive electrode tab 7 coated with a positive electrode material 1, a separator 2, and a negative electrode tab 8 coated with a negative electrode material 3. The wound body 10 is formed by winding the laminate into a flat shape. A plate-shaped positive electrode 5 is welded to the positive electrode tab 7, and a plate-shaped negative electrode 6 is welded to the negative electrode tab 8. The positive electrode material 1 is, for example, lithium cobalt oxide, and the negative electrode material 3 is, for example, carbon or polyacetylene.

Figure 7A:
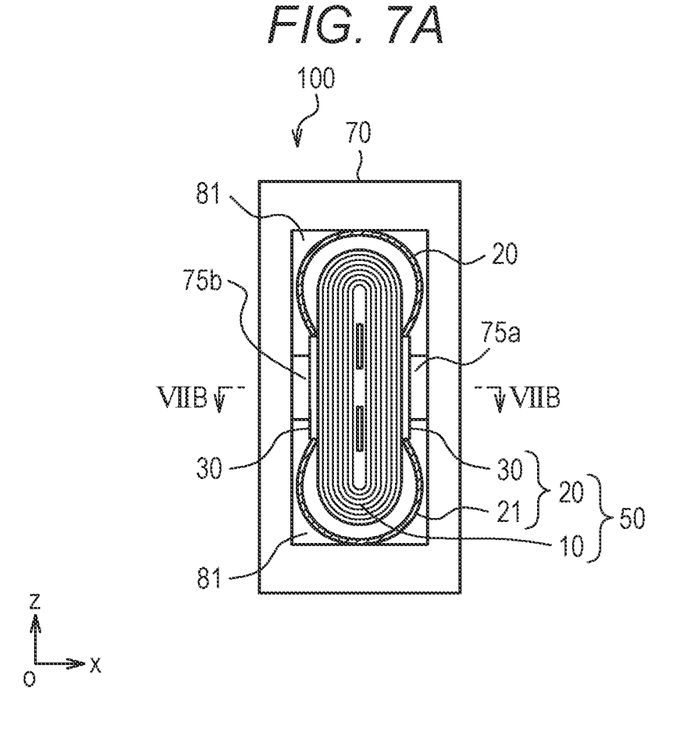
FIG. 7A is a left side view of an exterior body of the lithium battery module according to the first embodiment of the present invention in an expanding state.
Figure 7B:
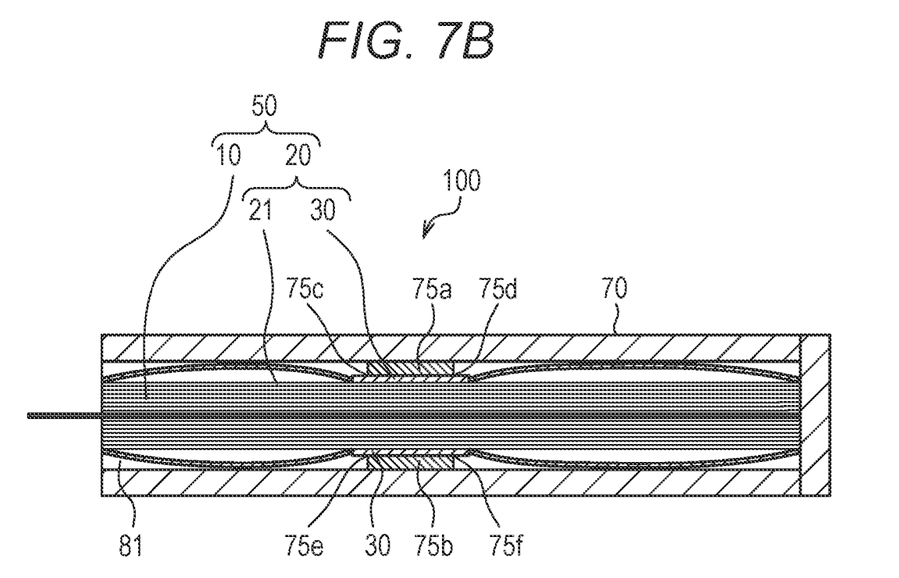
FIG. 7B is a sectional view of the exterior body of the lithium battery module of the first embodiment of the present invention in an expanding state.

FIGS. 7A and 7B are structural diagrams of the exterior body 20 of the lithium battery according to the first embodiment of the present invention in an expanding state. FIG. 7A shows a left side face, and FIG. 7B shows a VIIB cross section.

In the lithium battery 100, gas is generated by repeated charging and discharging, and the exterior body 20 expands. The volume of the internal space 80 (FIG. 4A) decreases due to the expansion of the exterior body 20 (main body portion 21). The space with a reduced volume is referred to as an internal space 81. In addition, due to its expansion, the exterior body 20 presses the entire surfaces of the projecting portions 75*a* and 75*b* facing each other through the non-stretchable members 30 and 30. The pressing force as the reaction of this pressing is transmitted to the wound body 10 through the non-stretchable regions (non-stretchable members 30 and 30) of the exterior body 20, and the pressing force from the exterior body 20 fixes the wound body 10. Thus, the wound body 10 is fixed with the entire surfaces of the projecting portions 75*a* and 75*b* just by the corner portions 75*c*, 75*d*, 75*e*, and 75*f* (FIGS. 4B and 7B) supplementarily supporting the non-stretchable members 30 and 30 and the projecting portions 75*a* and 75*b*. Furthermore, since the non-stretchable members 30 and 30 have a larger contact area than the projecting portions 75*a* and 75*b* and prevent the exterior body 20 from expanding with a wider region than the projecting portions 75*a* and 75*b*. Consequently, sliding of the constituent members of the wound body 10 is reduced, and it is possible to prevent a short circuit between the positive electrode and the negative electrode.

Second Embodiment

FIG. 8A is a perspective view of the back side of an electronic device according to a second embodiment of the present invention, and FIG. 8B is a perspective view of a battery lid.

An electronic device 301 is a handheld terminal including a casing 201 (FIG. 8A) and a battery lid 211 (FIG. 8B) and houses a cell 50 (FIG. 5) as a lithium battery. The electronic device 301 is not limited to the handheld terminal and may be a mobile terminal, such as a smartphone or a tablet. In addition, as in the first embodiment, non-stretchable members 30 and 30 are formed in the center portions of flat surfaces 20*a* and 20*b* of the cell 50.

A battery housing portion 205 of the casing 201 is provided with a projecting portion 201*a* (pressing member) as a fixing means. The battery lid 211 is provided with a projecting portion 211*a* as a fixing means. That is, in the present embodiment, the battery housing portion 205 and the battery lid 211 serve as the protective case 70. When the battery housing portion 205 is covered with the battery lid 211, the projecting portion 201*a* and the projecting portion 211*a* face each other. In addition, when the cell 50 is housed inside the battery housing portion 205 and is covered with the battery lid 211, the projecting portion 211*a* presses the cell 50. That is, the projecting portion 201*a* and the projecting portion 211*a* apply pressing force to the wound body 10 through the non-stretchable members 30 and 30 that are a part of the exterior body 20 to fix the wound body 10. As in the first embodiment, the non-stretchable members 30 and 30 are wider than the projecting portion 201*a* and the projecting portion 211*a*.

Third Embodiment

In the lithium battery 100 and the cell 50 in the first and second embodiments, the non-stretchable members 30 and 30 are fixed in such a manner as to be fitted in a partial region of the exterior body 20. However, the exterior body 20 and the non-stretchable members can be fixed by bonding the non-stretchable members to a partial region of the exterior body 20 from the outside of the exterior body 20.

Figure 9A:
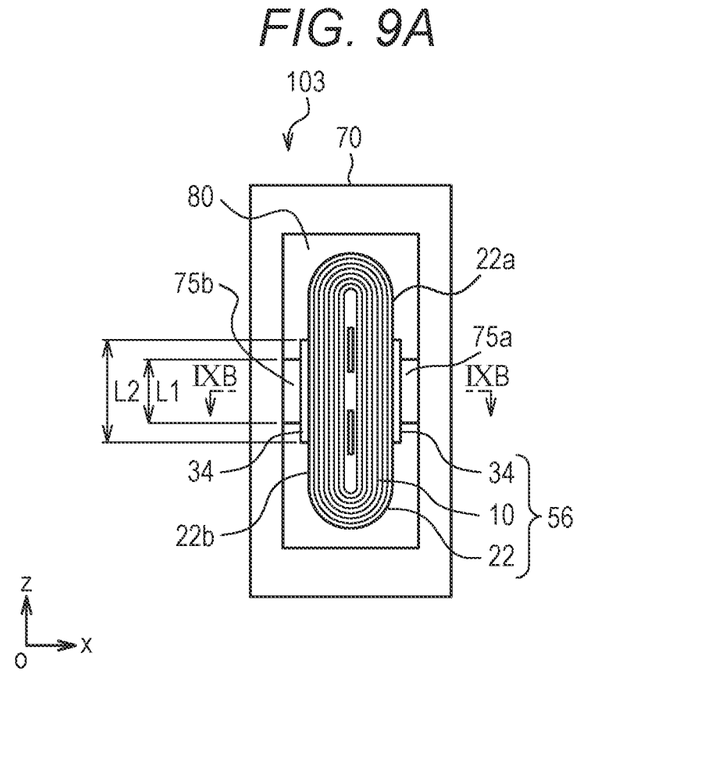
FIG. 9A is a left side view of a lithium battery module according to a third embodiment of the present invention.
Figure 9B:
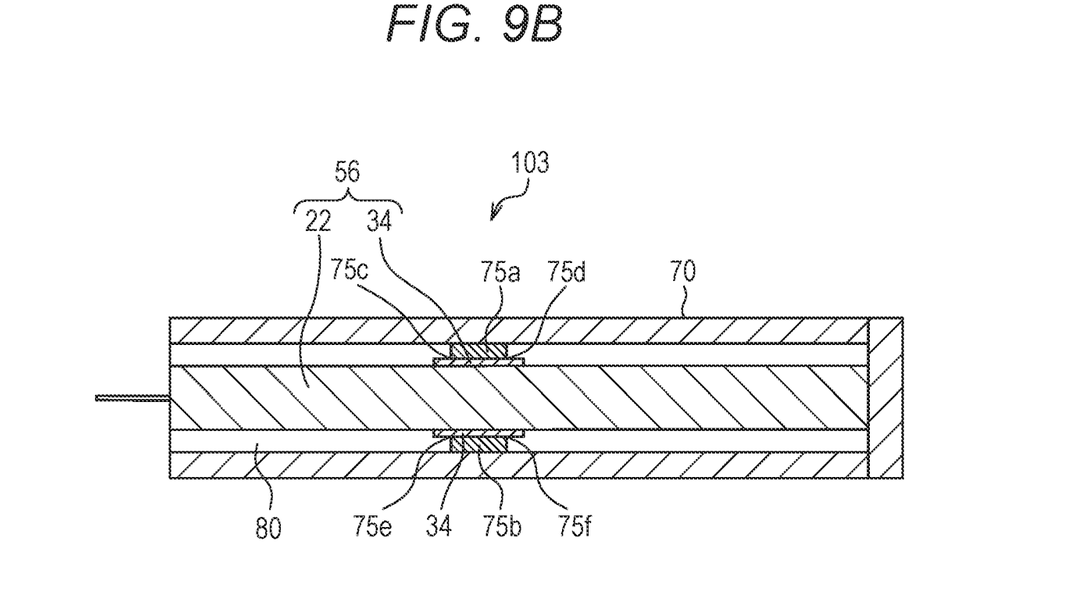
FIG. 9B is a sectional view of the lithium battery module according to the third embodiment of the present invention.

FIG. 9A is a left side view of a lithium battery module according to a third embodiment of the present invention, and FIG. 9B is an IXB cross section thereof.

A lithium battery 103 includes, similarly to the lithium battery 100 of the first embodiment, a protective case 70 and two projecting portions 75*a* and 75*b*, but is different in that a cell 56 is included instead of the cell 50.

The cell 56 includes an exterior body 22, a wound body 10 (FIG. 6) accommodated in the exterior body 22, and two non-stretchable members 34 and 34. The non-stretchable members 34 and 34 are bonded to a partial region of a pair of flat surfaces 22*a* and 22*b* of the exterior body 22. The exterior body 20 (FIG. 4A) in the first embodiment includes the main body portion 21 and the non-stretchable members 30 and 30, and a combination of them encloses the wound body 10. However, the exterior body 22 in the present embodiment alone encloses the wound body 10. In the claims, a combination of the exterior body 22 and the two non-stretchable members 34 and 34 is referred to as an exterior body, the exterior body 22 is referred to as a first member serving as a base, and each of the non-stretchable members 34 and 34 is referred to as a second member. That is, the second member is provided in a partial region of the combined exterior body. The thickness of each of the projecting portions 75*a* and 75*b* is enough for the cell 56 formed by the exterior body 22 and the non-stretchable members 34 and 34 to be inserted.

Figure 10A:
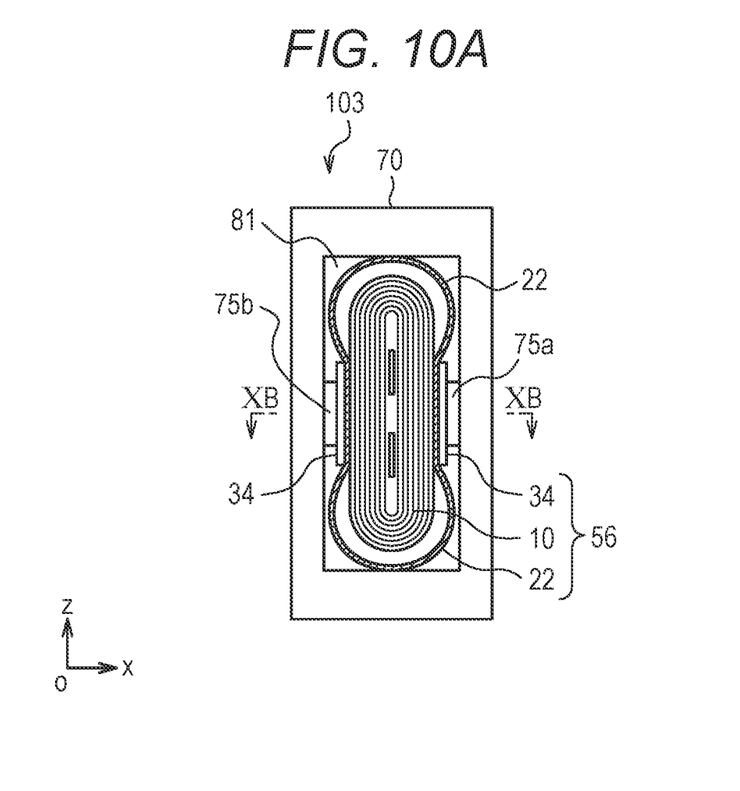
FIG. 10A is a left side view of an exterior body of the lithium battery module according to the third embodiment of the present invention in an expanding state.
Figure 10B:
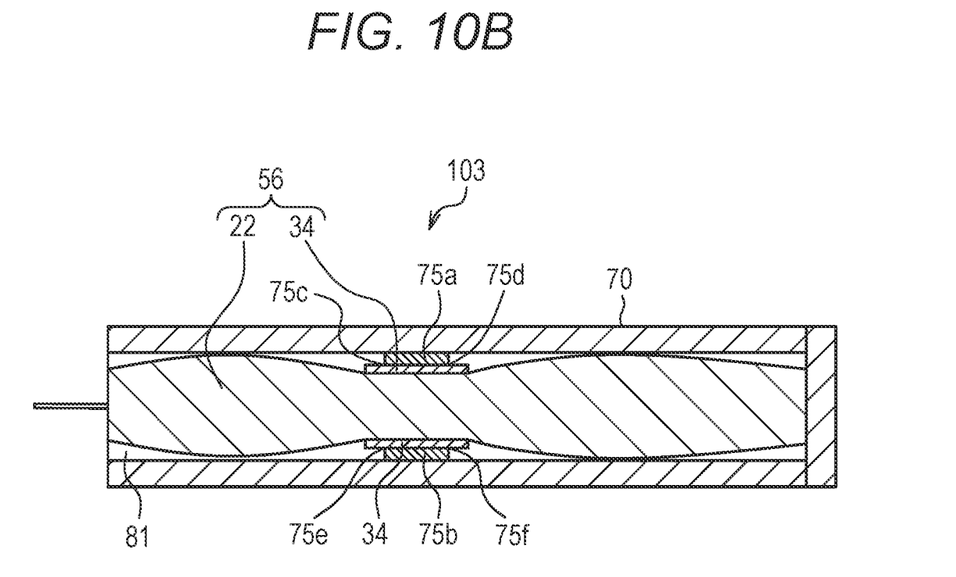
FIG. 10B is a sectional view of the exterior body of the lithium battery module according to the third embodiment of the present invention in an expanding state.

FIGS. 10A and 10B are structural diagrams of the exterior body 22 of the lithium battery according to the third embodiment of the present invention in an expanding state and correspond to FIGS. 7A and 7B in the first embodiment.

Due to its expansion, the exterior body 22 presses the entire surfaces of the projecting portions 75*a* and 75*b* facing each other through the non-stretchable members 34 and 34. The pressing force as the reaction of this pressing is transmitted to the wound body 10 through the non-stretchable members 34 and 34 of the exterior body 22, and the pressing force from the exterior body 22 fixes the wound body 10.

(Modification)

In the lithium battery 100 in the first embodiment, the non-stretchable members 30 and 30 are formed on the flat surfaces 20*a* and 20*b* of the exterior body 20, and the projecting portions 75*a* and 75*b* as fixing means are provided on the inner face of the protective case 70. The structure of the lithium battery 100 can be modified as follows, for example. Note that, the following modifications are modifications of the first embodiment, but are also applicable to the third embodiment.

(1) A lithium battery 101 (left side view) in FIG. 11 includes a cell 51, a protective case 71, and projecting portions 75*a* and 75*b*. The cell 51 includes a wound body 10 and an exterior body 25. Non-stretchable members 31 and 31 are formed at the center portions of the exterior body 25. Each of the non-stretchable members 31 and 31 is configured in such a manner that the length L3 in the Z direction is shorter than the length L2 of each of the projecting portions 75*a* and 75*b* and that the thickness in the X direction is thick.

(2) A lithium battery 102 (plan view) in FIG. 12 includes a protective case 70 and a cell 52 in which two non-stretchable members 32 and 32 are formed on an exterior body 22. The protective case 70 is formed in such a manner that cylindrical projecting portions 76 and 76 face each other. The non-stretchable members 32 and 32 are circular plate materials and have a larger area than the projecting portions 76 and 76.

Figure 13:
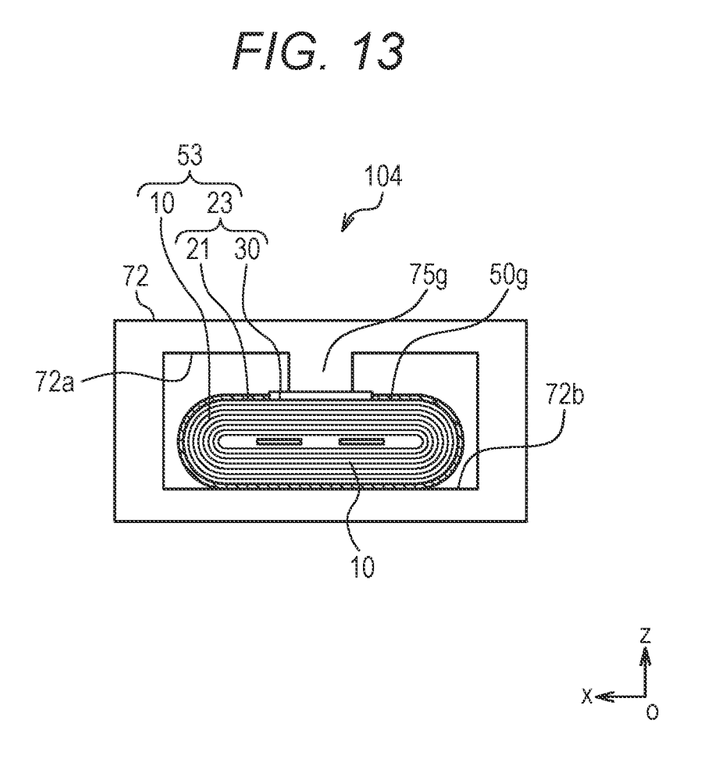
FIG. 13 is a left side view of a lithium battery module of a third modification of the present invention.

(3) A lithium battery 104 in FIG. 13 includes a protective case 72 and a cell 53 including a wound body 10 and an exterior body 23. The protective case 72 has an inner face 72a on which a projecting portion 75g extends. The exterior body 23 is formed with a non-stretchable member 30 in a partial region thereof. An inner face 72b of the protective case 72 and a main body portion 21 of the exterior body 23 are in contact with each other, and the non-stretchable member 30 is not inserted between the inner face 72b and the region of the exterior body 23 in contact with the inner face 72b. The projecting portion 75g functions as a fixing means for fixing the wound body 10 by the pressing force from the exterior body 23 (non-stretchable member 30).

Figure 14A:
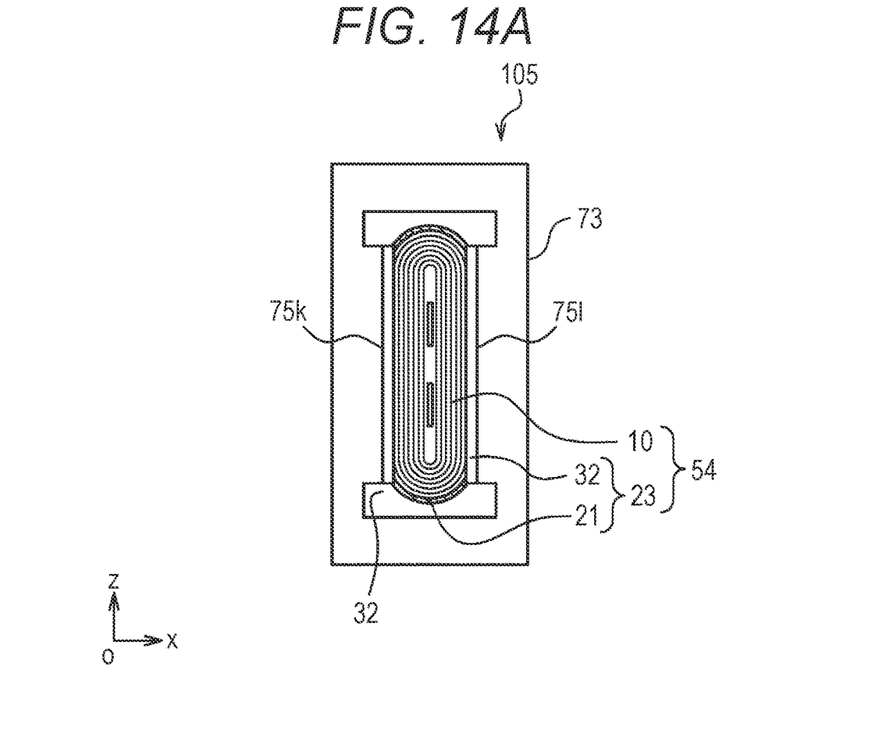
FIG. 14A is a left side view of a lithium battery module of a fourth modification of the present invention.
Figure 14B:
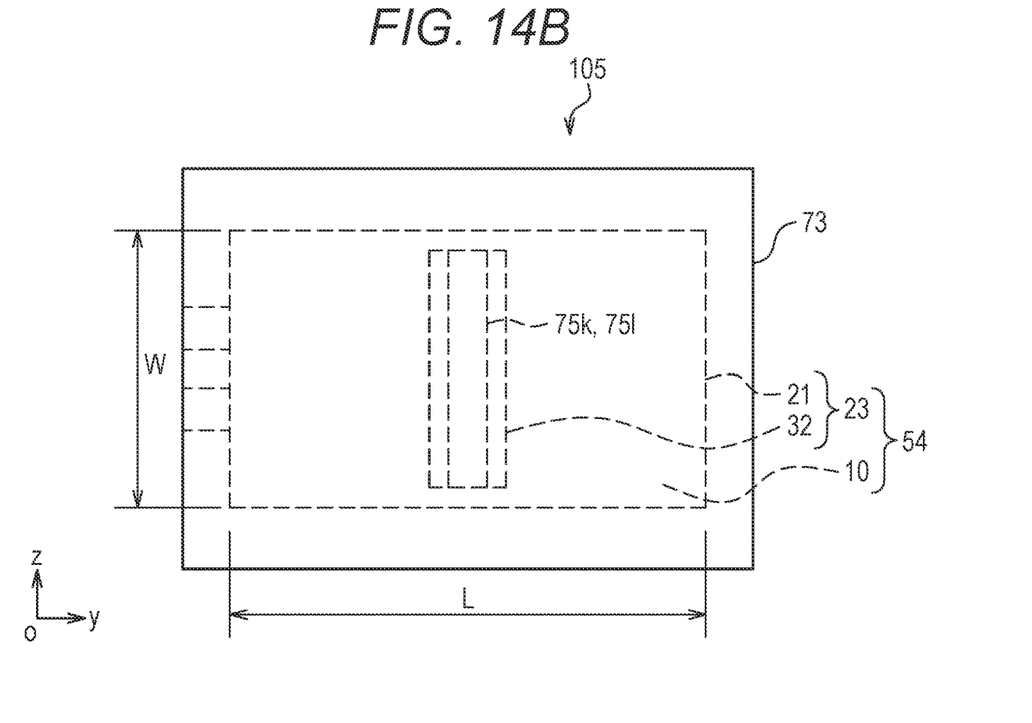
FIG. 14B is a plan view of a lithium battery module according to a fourth modification of the present invention.

(4) A lithium battery 105 in FIGS. 14A and 14B includes a cell 54 and a protective case 73. FIG. 14A is a left side view, and FIG. 14B is a plan view. The cell 54 is formed by a wound body 10 and an exterior body 23. The exterior body 23 includes two non-stretchable members 32 and 32 formed on a main body portion 21. That is, a large part of each non-stretchable members 32 bites into the inner face of the exterior body 23. Compared with the protective case 70 (FIG. 4A) in the first embodiment, the protective case 73 includes projecting portions 75k and 75l that extend in such a manner as to face each other, instead of the projecting portions 75a and 75b. Each of the projecting portions 75k and 75l is longer in the Z direction than each of the projecting portions 75a and 75b (FIG. 4A), and the length thereof is close to the width W of the cell 54. The projecting portions 75k and 75l are provided at the center portions of the flat surfaces of the exterior body 23 in such a manner as to face each other. The non-stretchable members 32 and 32 are provided on the exterior body 23 of the cell 54 and have a larger surface area than the projecting portions 75k and 75l. The non-stretchable members 32 and 32 are fixed at the center portions of the flat surfaces of the exterior body 23.

According to the lithium battery 105, the projecting portions 75k and 75l and the non-stretchable members 32 and 32 each are longer in the direction of the width W than the non-stretchable member 30, which reduces displacement in comparison to the lithium battery 100 in the first embodiment (FIGS. 4A and 4B). Consequently, sliding of the members of the wound body 10 is reduced, and it is possible to prevent a short circuit between the positive electrode and the negative electrode.

Figure 15:
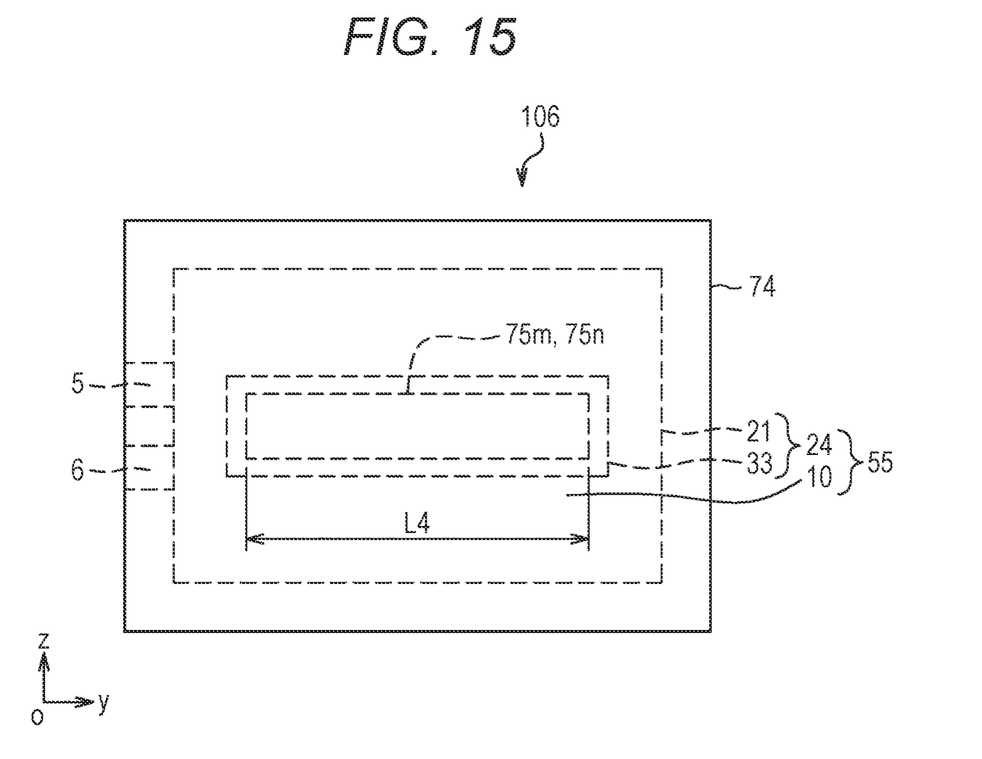
FIG. 15 is a plan view of a lithium battery module according to a fifth modification of the present invention.

(5) FIG. 15 is a plan view of a fifth modification of the lithium battery module of the present invention when viewed from above the lithium battery module. The left side view is the same as FIG. 4A. A lithium battery 106 in FIG. 15 includes a cell 55 and a protective case 74 formed with projecting portions 75m and 75n. The cell 55 is formed by a wound body 10 and an exterior body 24. The exterior body 24 is formed by integrally forming two non-stretchable members 33 and 33 with a main body portion 21. The non-stretchable members 33 and 33 are configured to have a longer length in the y direction than the length L4 of each of the projecting portions 75m and 75n.

In addition, the non-stretchable members 33 and 33 and the projecting portions 75m and 75n of the lithium battery module in FIG. 15 each are formed in such a manner that the length in the y direction is longer than the length in the z direction. Consequently, the lithium battery module as a whole is also formed in such a manner that the length in the y direction is longer than the length in the z direction, and it is possible to efficiently transmit the pressing force from the exterior body 24 to the wound body through the non-stretchable members 33 and 33 when the exterior body 24 expands and to more easily prevent the wound body from being displaced.

As described above, the lithium battery 100 according to each embodiment includes the cell 50, the protective case 70 that accommodates the cell 50, and the projecting portions 75a and 75b. The cell 50 includes the wound body 10 and the exterior body 20 that houses the wound body 10. The wound body 10 is formed by winding the positive electrode tab 7 and the negative electrode tab 8 with the separator 2 interposed therebetween. The exterior body 20 is provided with the non-stretchable region by being partially formed by the non-stretchable member 30. Here, the non-stretchable member 30 is formed as a part of the exterior body 20. The projecting portions 75a and 75b transmit the pressing force from the protective case 70, which is the reaction of the pressure generated when the exterior body 20 expands, to the wound body 10 through the non-stretchable region to fix the wound body 10 by the pressing force from the exterior body 20.

Consequently, since the exterior body 20 of the cell 50 is supported by the projecting portions 75a and 75b, it is possible to fix the wound body 10 by the pressing force from the protective case 70 although the exterior body 20 expands due to repeated charging/discharging.

In the above embodiments, a "lithium battery module" has been simply referred to as a "lithium battery", but the "lithium battery" in this specification includes a wound body and an exterior body (a main body portion and a non-stretchable member), and the "lithium battery module" includes a wound body, an exterior body (a main body portion and a non-stretchable member), a protective case, and a pressing member (a projecting portion) a fixing means.

The embodiments of the present invention have been described, but the scope of the present invention is not limited to the above described embodiments, and includes the scope described in the claims and equivalents thereof.

What is claimed is:

1. A lithium battery module comprising:
a wound body formed by winding a positive electrode and a negative electrode with a separator interposed between the positive electrode and the negative electrode;
an exterior body enclosing the wound body;
a protective case housing the exterior body; and
a pressing member provided between the exterior body and the protective case,
wherein:
the exterior body includes:
a first member serving as a base; and
a second member provided in a partial region of the exterior body,
the second member has a lower stretchability than the first member, the pressing member contacts with the second member and transfers a pressing force from the protective case to the wound body through the second member to fix the wound body by a pressing force from the exterior body, and an area of the partial region in which the second member is provided is larger than a contact area between the second member and the pressing member.

2. The lithium battery module according to claim 1, wherein the second member is provided in such a manner as to be fitted in the partial region of the exterior body.

3. The lithium battery module according to claim 1, wherein the second member is provided by being bonded from an outside of the exterior body to the partial region of the exterior body.

4. The lithium battery module according to claim 1, wherein the pressing member transmits a pressing force generated when the exterior body expands to the wound body through the second member.

5. The lithium battery module according to claim 1, wherein:

the exterior body has a flat shape having a pair of flat surfaces, the second member is provided on each of the pair of flat surfaces in such a manner that the second member provided on one flat surface overlaps the second member provided on the other flat surface, and the pressing member includes:
a first pressing member corresponding to the second member provided on the one flat surface; and
a second pressing member corresponding to the second member provided on the other flat surface.

6. The lithium battery module according to claim 1, wherein the pressing member is disposed in such a manner as to form a space between the protective case and the exterior body and on both sides of the pressing member when the pressing member is sandwiched between the protective case and the second member.

7. The lithium battery module according to claim 1, wherein a thickness of the second member is greater than a thickness of the first member such that the pressing member is prevented from being in contact with a region of the first member of the exterior body when the pressing member is sandwiched between the protective case and the second member.

8. The lithium battery module according to claim 1, wherein the second member and the pressing member are cylindrical.

9. The lithium battery module according to claim 5, wherein the second member is provided at a center portion of the each of the pair of flat surfaces of the exterior body.

10. The lithium battery module according to claim 1, wherein the second member comprises a plate material made of resin, glass, or ceramic.

11. An electronic device comprising a casing housing the lithium battery module according to claim 2.

12. An electronic device comprising a casing capable of mounting the lithium battery module according to claim 2.

13. An electronic device comprising:
a lithium battery module; and
a casing housing the lithium battery module,
the lithium battery module comprising:
a wound body formed by a positive electrode and a negative electrode with a separator interposed between the positive electrode and the negative electrode;
an exterior body enclosing the wound body, the exterior body including (i) a first member serving as a base, and (ii) a second member having less stretchability than the first member;
a protective case housing the exterior body; and
a pressing member provided between the exterior body and the protective case,
wherein:
the pressing member contacts with the second member and transfers a pressing force from the protective case to the wound body through the second member to fix the wound body by a pressing force from the exterior body, and
an area of a partial region of the exterior body in which the second member is provided is larger than a contact area between the second member and the pressing member.

* * * * *

UNITED STATES PATENT AND TRADEMARK OFFICE
CERTIFICATE OF CORRECTION

PATENT NO. : 11,830,984 B2
APPLICATION NO. : 17/093949
DATED : November 28, 2023
INVENTOR(S) : Ryo Oe It is certified that error appears in the above-identified patent and that said Letters Patent is hereby corrected as shown below:

In the Claims

Column 10, Line 14, delete "claim 2" and insert --claim 1-- and;

Column 10, Line 16, delete "claim 2" and insert --claim 1--.

Signed and Sealed this
Twentieth Day of February, 2024

Katherine Kelly Vidal
*Director of the United States Patent and Trademark Office*